(12) United States Patent
Cook et al.

(10) Patent No.: US 9,290,263 B2
(45) Date of Patent: Mar. 22, 2016

(54) NOSE LANDING GEAR ARRANGEMENTS AND METHODS FOR MAKING THE SAME

(71) Applicant: Gulfstream Aerospace Corporation, Savannah, GA (US)

(72) Inventors: Brian Cook, Savannah, GA (US); John Louis, Savannah, GA (US); Thomas Van de Ven, Savannah, GA (US); Robert M. Vieito, Savannah, GA (US); Mehdi R. Khorrami, Norfolk, VA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 133 days.

(21) Appl. No.: 14/201,345

(22) Filed: Mar. 7, 2014

(65) Prior Publication Data
US 2015/0251750 A1   Sep. 10, 2015

(51) Int. Cl.
| | |
|---|---|
| *B64C 25/10* | (2006.01) |
| *B64C 25/16* | (2006.01) |
| *B64C 23/00* | (2006.01) |
| *B64C 25/00* | (2006.01) |
| *B64C 25/04* | (2006.01) |
| *B64C 25/18* | (2006.01) |

(52) U.S. Cl.
CPC ............... *B64C 25/16* (2013.01); *B64C 23/005* (2013.01); *B64C 25/001* (2013.01); *B64C 25/04* (2013.01); *B64C 25/18* (2013.01); *B64C 2025/003* (2013.01); *Y10T 29/4984* (2015.01)

(58) Field of Classification Search
CPC .... B64C 23/005; B64C 25/001; B64C 25/16; B64C 25/18; B64C 2025/003
See application file for complete search history.

(56) References Cited

U.S. PATENT DOCUMENTS

| | | | | |
|---|---|---|---|---|
| 2,180,462 | A |    | 12/1937 | De Seversky |
| 4,408,736 | A | *  | 10/1983 | Kirschbaum ........... B64C 25/32 244/100 R |
| 7,458,542 | B2 | * | 12/2008 | Chow ........................ B64C 7/00 244/102 R |
| 7,651,053 | B2 | *  | 1/2010 | Fort .......................... B64C 7/00 244/102 R |
| 8,028,956 | B2 | * | 10/2011 | Chow ...................... B64C 25/16 244/102 R |
| 8,434,714 | B2 | *  | 5/2013 | Ekmedzic ............... B64C 25/10 244/100 R |

(Continued)

OTHER PUBLICATIONS

The United States International Searching Authority, International Search Report and Written Opinion for International Application No. PCT/US2015/016188, mailed May 19, 2015.

(Continued)

*Primary Examiner* — Philip J Bonzell
(74) *Attorney, Agent, or Firm* — Ingrassia, Fisher & Lorenz PC (57) ABSTRACT

Nose landing gear arrangements including a folding follow-up door for reducing airflow noise for aircrafts, aircrafts including such nose landing gear arrangements, and methods for making such nose landing gear arrangements are provided herein. In one example, a nose landing gear arrangement includes a wheel assembly and a main strut. The main strut is operatively coupled to the wheel assembly and is configured to extend outside of the fuselage substantially along a generally vertical plane. A folding follow-up door is pivotally coupled to the main strut and extends to the fuselage. The folding follow-up door includes a first door section and a second door section that extend outwardly in directions away from each other to define an unfolded position. The folding follow-up door is foldable to move the first and second door sections towards each other about the generally vertical plane to define a folded position.

18 Claims, 6 Drawing Sheets

(56) References Cited

U.S. PATENT DOCUMENTS

| | | |
|---|---|---|
| 8,490,914 B2 | 7/2013 | Chow et al. |
| 8,944,364 B2 * | 2/2015 | Langtry ............ B64C 25/16 244/1 N |
| 2004/0104301 A1 | 6/2004 | Wickerhoff et al. |
| 2006/0102775 A1 | 5/2006 | Chow et al. |
| 2010/0108805 A1 | 5/2010 | Piet et al. |
| 2015/0083857 A1 * | 3/2015 | Simonneaux ........... B64C 25/16 244/102 R |

OTHER PUBLICATIONS

"Airframe Noise Reduction Status and Plans," Mehdi R. Khorrami, AT Noise Reduction Element Lead Environmentally Responsible Aviation Integrated Systems Research Program, NASA, AIAA Aero Sciences Meeting Jan. 4-7, 2011, pp. 1-18.

* cited by examiner

NOSE LANDING GEAR ARRANGEMENTS AND METHODS FOR MAKING THE SAME

TECHNICAL FIELD

The technical field relates generally to nose landing gear arrangements for aircrafts, and more particularly to nose landing gear arrangements including a folding follow-up door for reducing airflow noise for aircrafts, aircrafts including such nose landing gear arrangements, and methods for making such nose landing gear arrangements.

BACKGROUND

Noise generated by an aircraft as it approaches a runway during landing can be objectionable to surrounding communities. The noise generated by the aircraft on approach to the runway includes primarily two components. The first component is the noise generated by the engines of the aircraft. The second component includes the noise generated by the aircraft's landing gear pushing through the air.

For decades, the noise generated by the aircraft's engines had been the dominant source of noise generated by the aircraft during landing. Accordingly, noise reducing efforts have traditionally focused on reducing the magnitude of the noise generated by the aircraft's engines. These efforts have been fruitful, and as a result of these efforts, the noise generated by the aircraft's engines during landing is now typically no louder than the noise generated by the landing gears during landing. Therefore, to further diminish the noise generated by the aircraft during landing, the noise attributed to the landing gears needs to be reduced.

It has been found that conventional nose landing gear arrangements are particularly prone to generating objectionable noise during approach and landing. A conventional nose landing gear arrangement includes a wheel assembly that is operatively coupled to a main strut (e.g., typically via a shock strut or piston) and a follow-up door that is hingedly attached to both the main strut and the fuselage. The follow-up door serves two functions. First, when the nose landing gear arrangement is in the retracted position in which it is housed within the fuselage, the follow-up door is flush with the fuselage to provide a continuous outer surface with the fuselage. Second, when the nose landing gear arrangement is actuated via force from the aircraft's hydraulic system, the follow-up door moves with the main strut to form an opening in the fuselage to allow the main strut to be extended outside of the fuselage to position the wheel assembly for landing. As the nose landing gear arrangement is being extended, airflow passes over the follow-up door to facilitate moving the nose landing gear arrangement to the fully extended position, which serves as a backup to the hydraulic system in the event of any hydraulic issues. The airflow passing over the nose landing gear arrangement when in the fully extended position is made especially turbulent by the follow-up door producing a loud and undesirable noise as the aircraft approaches the airfield for landing.

Accordingly, it is desirable to provide nose landing gear arrangements for aircrafts that reduce airflow noise such as when the nose landing gear arrangement is in an extended position during an approach to landing, aircrafts including such nose landing gear arrangements, and methods for making such nose landing gear arrangements. Furthermore, other desirable features and characteristics of the present invention will become apparent from the subsequent detailed description and the appended claims, taken in conjunction with the accompanying drawings and this background.

BRIEF SUMMARY

Nose landing gear arrangements for aircrafts, aircrafts including nose landing gear arrangements, and methods for making nose landing gear arrangements are provided herein. In an exemplary embodiment, a nose landing gear arrangement for an aircraft that includes a fuselage comprises a wheel assembly and a main strut. The main strut is operatively coupled to the wheel assembly and is configured to extend outside of the fuselage substantially along a generally vertical plane to position the wheel assembly for takeoff and/or landing of the aircraft. A folding follow-up door is pivotally coupled to the main strut and extends to the fuselage. The folding follow-up door comprises a first door section and a second door section that extend outwardly in directions away from each other to define an unfolded position. The folding follow-up door is foldable to move the first and second door sections towards each other about the generally vertical plane to define a folded position.

In accordance with another exemplary embodiment, an aircraft comprises a fuselage and a nose landing gear arrangement. The nose landing gear arrangement is moveable between a retracted position in which the nose landing gear arrangement is disposed in the fuselage and an extended position in which the nose landing gear arrangement extends outside of the fuselage. The nose landing gear arrangement comprises a wheel assembly and a main strut. The main strut is operatively coupled to the wheel assembly and is configured to extend distally outside of the fuselage substantially along a generally vertical plane to position the wheel assembly in the extended position for takeoff and/or landing of the aircraft. A folding follow-up door is pivotally coupled to the main strut and extends to the fuselage. The folding follow-up door comprises a first door section and a second door section that extend outwardly in directions away from each other to define an unfolded position. The folding follow-up door is foldable to move the first and second door sections towards each other about the generally vertical plane to define a folded position.

In accordance with another exemplary embodiment, a method for making a nose landing gear arrangement for an aircraft that includes a fuselage is provided. The method comprises the steps of operatively coupling a main strut to a wheel assembly. A folding follow-up door is pivotally coupled to the main strut and is extended to the fuselage. The folding follow-up door is foldable to move first and second door portions of the folding follow-up door towards each other about a generally vertical plane that is substantially aligned with the main strut to define a folded position.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments contemplated herein relate to nose landing gear arrangements for aircrafts, aircrafts including nose landing gear arrangements, and methods for making such nose landing gear arrangements. The exemplary embodiments taught herein provide a nose landing gear arrangement that is moveable between a retracted position in which the nose landing gear arrangement is disposed in a fuselage of an aircraft and an extended position in which the nose landing gear arrangement extends outside of the fuselage.

The nose landing gear arrangement comprises a wheel assembly, a main strut that is operatively coupled to the wheel assembly, and a folding follow-up door that is pivotally coupled to the main strut and extends to the fuselage. In an exemplary embodiment, when the nose landing gear arrangement is moving from the retracted position to the extended position, the main strut is moved outside of the fuselage substantially along a generally vertical plane to position the wheel assembly for landing of the aircraft. The folding follow-up door comprises a first door section and a second door section that extend outwardly in directions away from each other to define an unfolded position. As such, airflow passing over the folding follow-up door creates significant drag that facilitates moving the nose landing gear arrangement to the extended position. At an intermediate position (e.g., partially extended position) between the retracted and extended positions, the folding follow-up door begins to fold moving the first and second door sections toward each other about the generally vertical plane to define a folded position. In an exemplary embodiment, when the nose landing gear arrangement is in the fully extended position, the folding follow-up door is in the folded position and has less area exposed to the airflow, thereby reducing drag and objectionable noise as the aircraft approaches an airfield for landing.

Figure 1:
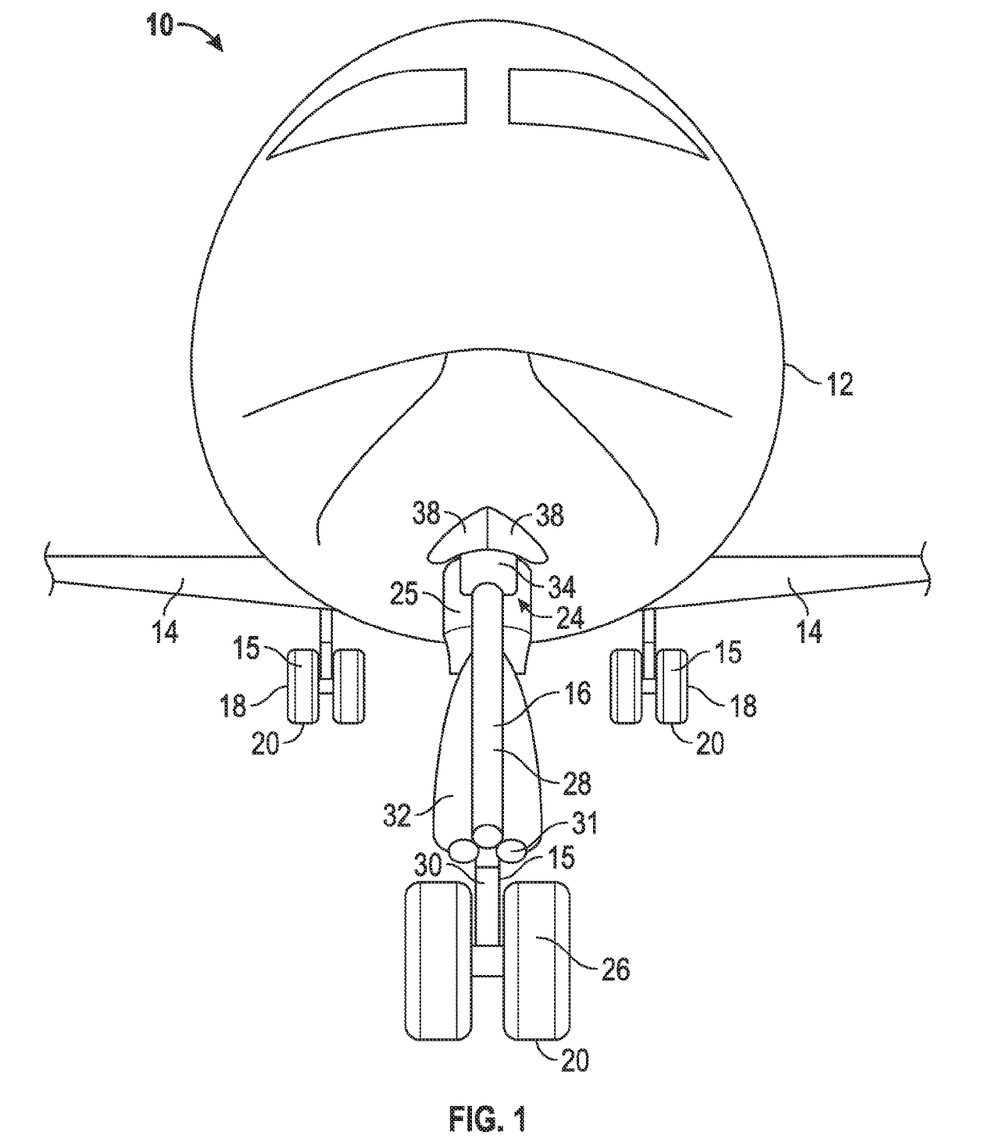
FIG. 1 is a partial front view of an aircraft including a nose landing gear arrangement in accordance with an exemplary embodiment.

FIG. 1 is a partial front view of an aircraft 10 in accordance with an exemplary embodiment. The aircraft 10 has a fuselage 12 that encloses an aircraft cabin. Adjacent to the fuselage 12 are wings 14 that produce lift for flight. The aircraft 10 has landing gear arrangements 15 including a nose landing gear arrangement 16 proximate a forward portion of the aircraft 10 and rear landing gear arrangements 18 that extend from the wings 14 aft of the nose landing gear arrangement 16. As illustrated, the landing gear arrangements 15 are in an extended position 20 for takeoff and landing of the aircraft 10 and to support the weight of the aircraft 10 while the aircraft 10 is on the ground. The nose landing gear arrangement 16 is further configured to allow the pilot to steer the aircraft 10 while taxiing the aircraft 10. The nose landing gear arrangement 16 is compatible for use with all types of aircrafts including military and civilian aircrafts and they may also be compatible for use with other types of vehicles as well, including, but not limited to, spacecrafts.

As illustrated, the nose landing gear arrangement 16 comprises a wheel assembly 26 operatively coupled to a main strut 28 via a shock strut 30. The shock strut 30 includes one or more springs and/or one or more dampers and is configured to telescopically collapse under loading upon touchdown and then partially re-expand after landing. A light cluster 31 is disposed along the main strut 28 above the shock strut 30.

In an exemplary embodiment and as will be discussed in further detail below, a folding follow-up door 32 is pivotally coupled to the main strut 28 and independently to the fuselage 12 (e.g., underlying structure that supports the outer skin of the aircraft 10). In the extended position 20, the nose landing gear arrangement 16 extends from a fuselage cavity 24 through an opening 25 in the fuselage 12 to outside of the fuselage 12. As is well known in the art, an actuator (e.g., schematically indicated with ref no. 34) is operatively coupled to the main strut 28 in the fuselage cavity 24 and includes a hydraulic system. The actuator 34 is configured to move the nose landing gear arrangement 16 between the extended position 20 and a retracted position 36 (see FIG. 5) in which the nose landing gear arrangement 16 is disposed in the fuselage cavity 24 and the folding follow-up door 32 covers the opening 25 and is flush with the fuselage 12. Immediately forward of the opening 25 are clamshell doors 38 that open to augment the size of the opening 25 to allow the nose landing gear arrangement 16 to move unobstructed through the opening 25 between the extended and retracted positions 20 and 36.

Figure 2:
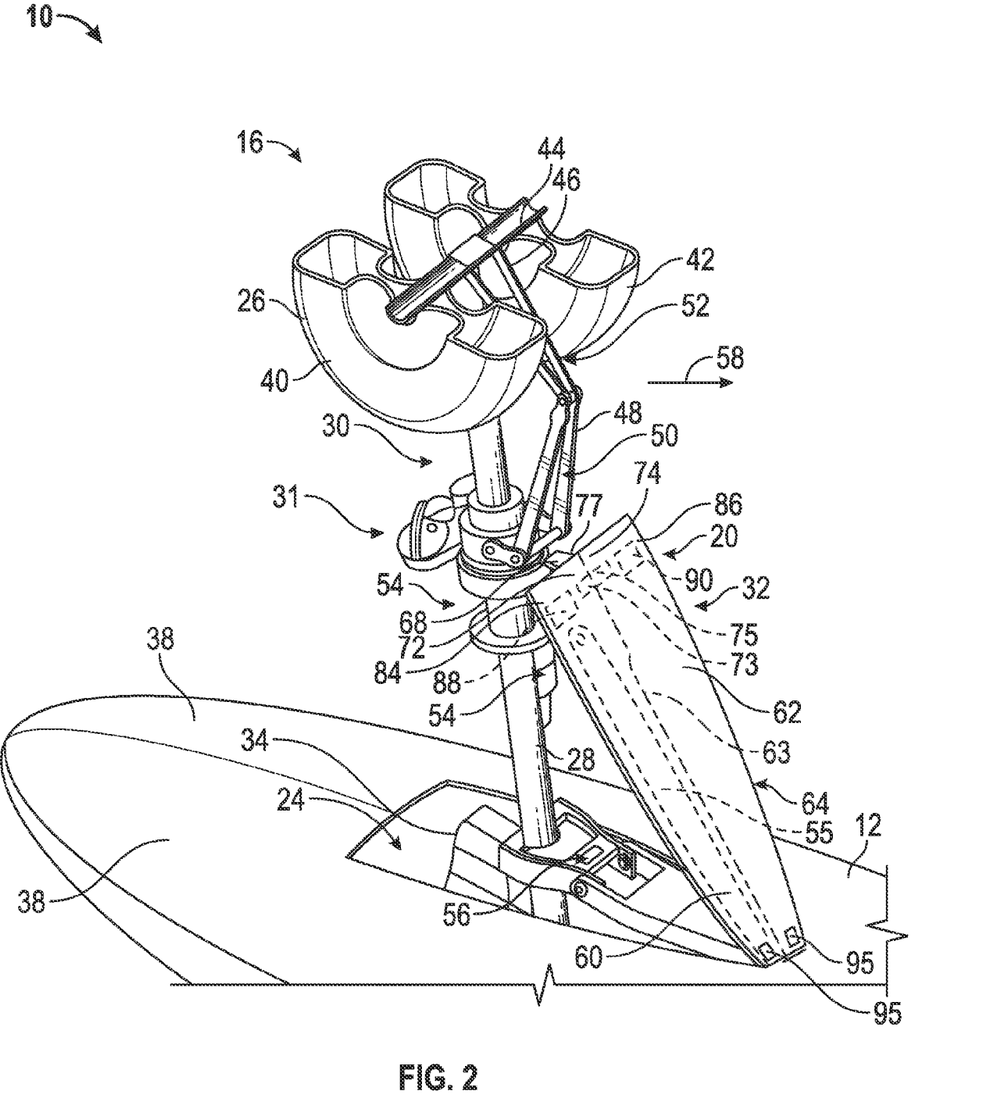
FIG. 2 is a perspective view of a nose landing gear arrangement in accordance with an exemplary embodiment.

FIG. 2 is a perspective bottom view of the nose landing gear arrangement 16 in accordance with an exemplary embodiment. The wheel assembly 26 includes a pair of wheels 40 and 42, an axle 44, and a coupling 46 for mounting the wheel assembly 26 to the shock strut 30. A torque arm assembly 48 includes an upper torque arm 50 that is coupled to the main strut 28 and a lower torque arm 52 that is coupled to the coupling 46. The torque arm assembly 48 is configured to assist the shock strut 30 in telescopic movement during landing. A steering mechanism 54 is operatively coupled to the main strut 28 to permit steering of the aircraft 10. As will be discussed in further detail below, a drag brace 55 is pivotally coupled to the main strut 28 to facilitate moving the nose landing gear arrangement 16 in cooperation with the actuator 34 between the extended and retracted positions 20 and 36 (see also FIG. 5). In the extended position 20, the main strut 28 is stabilized against a truss brace 56 for takeoff and/or landing.

As illustrated, the folding follow-up door 32 is positioned aft (indicated by single headed arrow 58) of the drag brace 55 and extends between the main strut 28 and the fuselage 12. In an exemplary embodiment, the folding follow-up door 32 comprises door sections 60 and 62 that are hingedly coupled together along a generally longitudinal fold section 63.

Figure 3A:
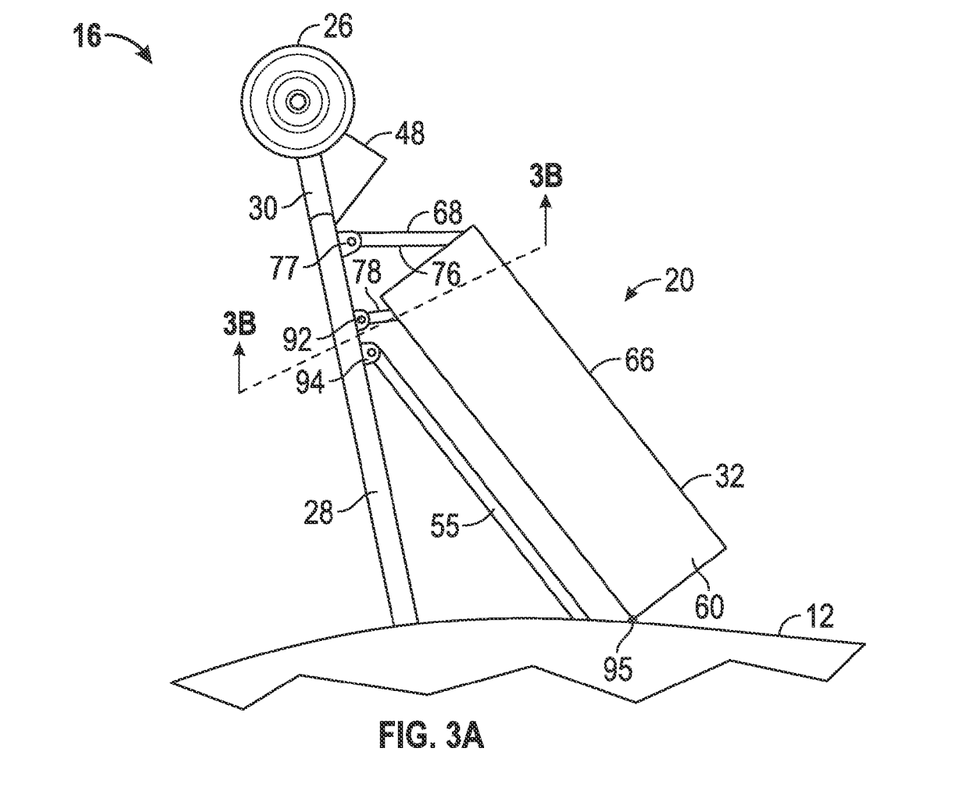
FIG. 3A is a side view of a nose landing gear arrangement in an extended position in accordance with an exemplary embodiment.

FIGS. 3A-5, illustrate the nose landing gear arrangement 16 at various positions from the extended position 20 (FIGS. 3A-3B) to the retracted position 36 (FIG. 5) in accordance with various embodiments. The described steps, procedures, and structures are to be considered only as exemplary embodiments designed to illustrate to one of ordinary skill in the art various ways for practicing the invention; the invention is not limited to these exemplary embodiments. Additionally, although FIGS. 1-2 show the folding follow-up door 32 in an unfolded position 64 when the nose landing gear arrangement 16 is in the extended position 20, this is primarily for illustrative purposes to be used in conjunction with the following descriptions provided in reference to FIGS. 3A-5 and that in various embodiments, the folding follow-up door 32 is in a folded position 66 when the nose landing gear arrangement 16 is in the extended position 20 as illustrated in FIGS. 3A-3B.

Figure 3B:
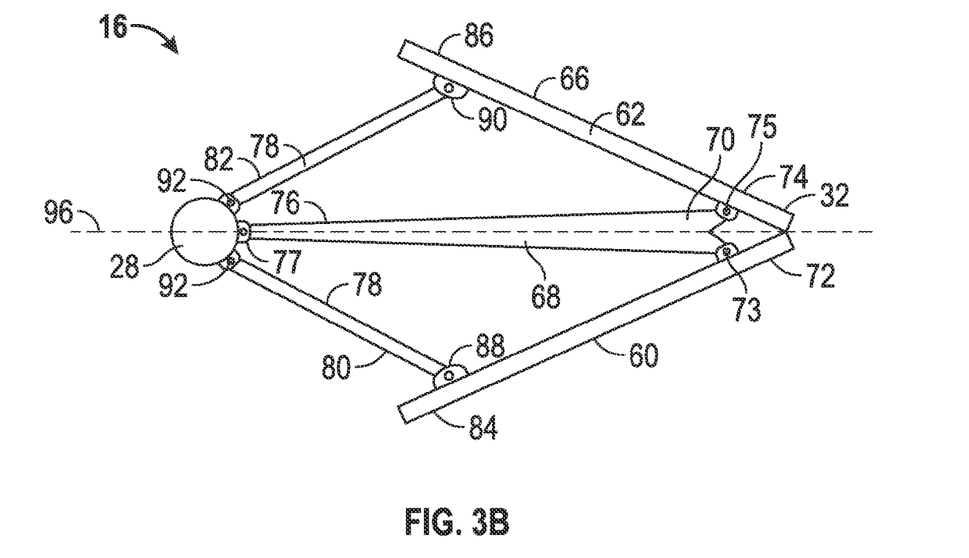
FIG. 3B is a sectional view of the nose landing gear arrangement depicted in FIG. 3A along line 3B-3B.

Referring to FIGS. 2 and 3A-3B, in an exemplary embodiment, the door sections 60 and 62 are hingedly coupled together via an actuating arm 68 that is pivotally coupled to the folding follow-up door 32. As illustrated, the actuating arm 68 is configured as an arm having a distal end portion 70 that has a "V-shape" in which one arm of the "V-shape" is pivotally connected to an inner edge portion 72 of the door section 60 to define a connection 73 and the other arm of the "V-shape" is pivotally coupled to an inner edge portion 74 of the door section 62 to define a connection 75. A proximal end portion 76 of the actuating arm 68 is pivotally coupled to the main strut 28 to define a connection 77. In one embodiment, each of the connections 73, 75, and 77 are configured as ball joints to allow pivotal movement.

A door brace 78 is pivotally coupled to the folding follow-up door 32 and independently to the main strut 28. As illustrated, the door brace 78 has two arms 80 and 82 that are pivotally coupled to outer edge portions 84 and 86 of the door sections 60 and 62 to define connections 88 and 90. The two arms 80 and 82 may be directly pivotally coupled to the main strut 28 defining connections 92, or alternatively, the two arms 80 and 82 may merge so that the door brace 78 is configured having a "Y-shape" in which the base arm of the "Y-shape" is pivotally connected to the main strut 28 via a single connection 92. In an exemplary embodiment, the connections 92 are disposed adjacent to a connection 94 that connects the drag brace 55 with the main strut 28. Additionally and as illustrated, the connection 77 is disposed along the main strut 28 distally from the connections 92. Along upper portions of the door sections 60 and 62, the folding follow-up door 32 is pivotally coupled to the fuselage 12 defining connections 95. In one embodiment, each of the connections 88, 90, 92, and 95 are configured as ball joints to allow pivotal movement.

Referring to FIGS. 3A-3B, in an exemplary embodiment, the nose landing gear arrangement 16 is in the extended position 20 and the folding follow-up door 32 is in the folded position 66. As illustrated, the door sections 60 and 62 are facing towards each other and a generally vertical plane 96 that is substantially aligned with the main strut 28 to define the folded position 66. In one example, about the generally vertical plane 96, the inner edge portions 72 and 74 are adjacent to each other and the outer edge portions 84 and 86 are position generally towards each other and the main strut 28.

Figure 4A:
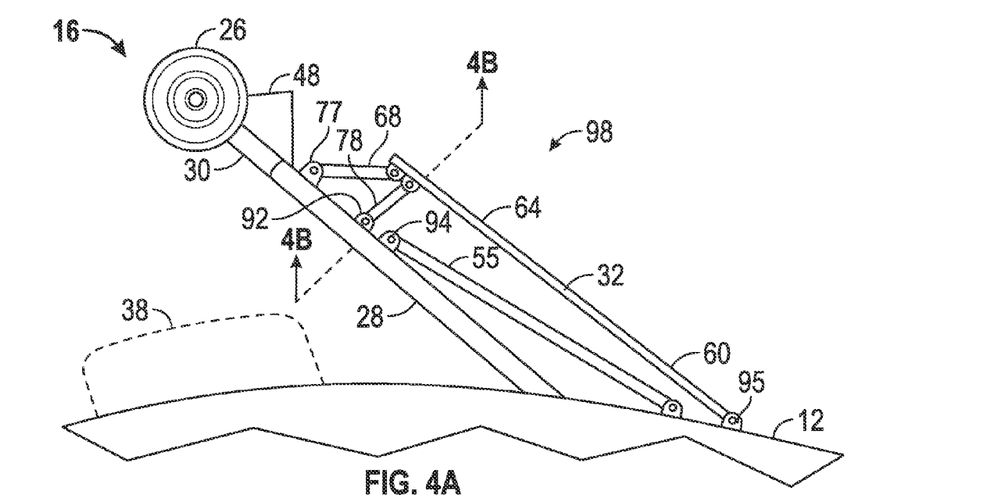
FIG. 4A is a side view of a nose landing gear arrangement in an intermediate position between an extended position and a retracted position in accordance with an exemplary embodiment.
Figure 4B:
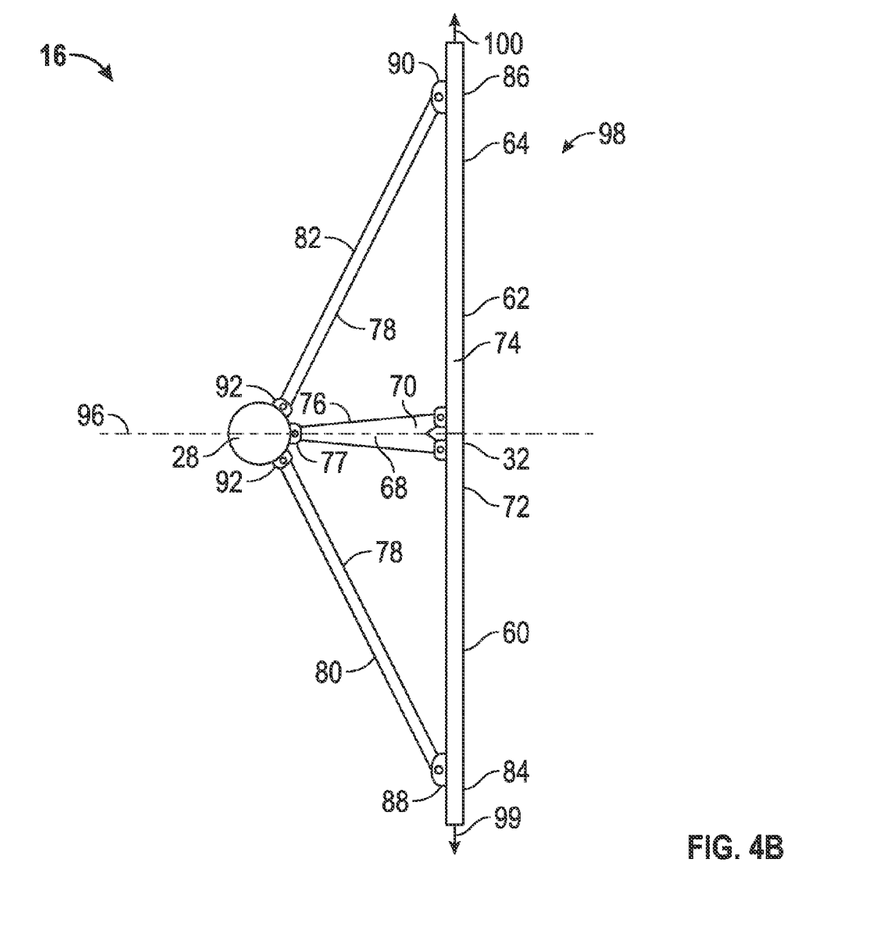
FIG. 4B is a sectional view of the nose landing gear arrangement depicted in FIG. 4A along line 4B-4B.

Referring to FIGS. 4A-4B, in an exemplary embodiment, the nose landing gear arrangement 16 is in a partially extended position 98 and the folding follow-up door 32 is in the unfolded position 64. As illustrated, the door sections 60 and 62 extend outwardly in directions (indicated by single headed arrows 99 and 100) away from each other and the generally vertical plane 96 to define the unfolded position 64. In one example, about the generally vertical plane 96, the inner edge portions 72 and 74 are adjacent to each other and the outer edge portions are positioned away from each other along the directions 99 and 100 that are generally opposite to each other.

Figure 5:
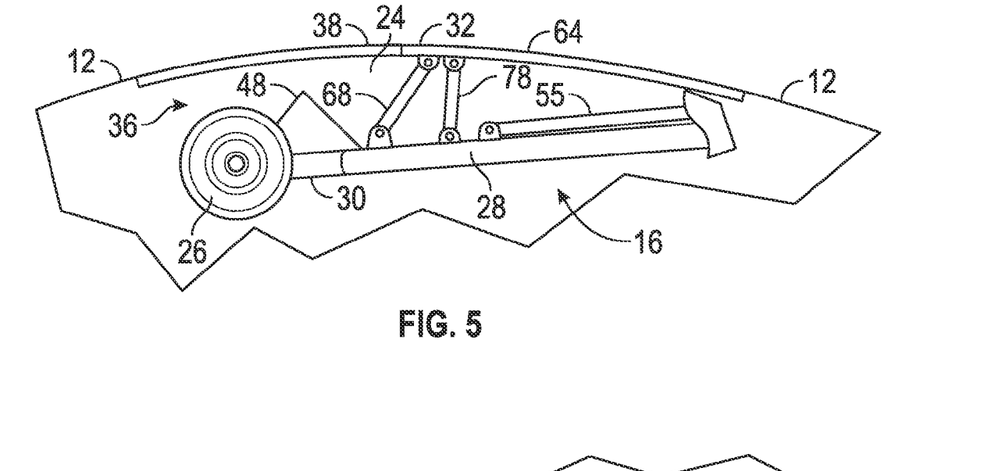
FIG. 5 is a side view of a nose landing gear arrangement in a retracted position in accordance with an exemplary embodiment.

Referring to FIG. 5, in an exemplary embodiment, the nose landing gear arrangement 16 is in the retracted positions 36. As illustrated and as discussed above, the nose landing gear arrangement 16 is disposed in the fuselage 12. The folding follow-up door 32 is in the unfolded position 64 and extends across the opening 25 to close off the opening 25 together with the clamshell doors 38 (see also FIG. 1). As such, the folding follow-up door 32 is flush with the fuselage 12 to form a continuous outer surface with the fuselage 12.

Referring to FIGS. 3A-5, the movement of the nose landing gear arrangement 16 including, in particular, the folding and unfolding of the folding follow-up door 32 between the extended and retracted positions 20 and 36 in accordance with an exemplary embodiment will now be described. The nose landing gear arrangement 16 in the retracted position 36 (see FIG. 5) is actuated via the actuator 34 (see FIG. 1) to be extended, for example, for landing of the aircraft 10. During an initial extension stage, the clamshell doors 38 are opened and the nose landing gear arrangement 16 is rotated from the retracted position 36 to the partially extended position 98 using a center of rotation that is located along a portion of the main strut 28 that is located within the fuselage cavity 24. As such, the relative position between the inner and outer edge portions 72 and 86 of the door sections 60 and 62 and the main strut 28, which are controlled by the actuating arm 68 and the door brace 78, remains relatively constant between the retracted and partially extended positions 36 and 98 such that the folding follow-up door 32 remains in the unfolded position 64. In the unfolded position 64, significant drag is produced by the airflow passing over the folding follow-up door 32 to facilitate extending the nose landing gear arrangement outside of the fuselage 12.

In an exemplary embodiment, once in the partially extended position 98, the center of rotation is moved to outside of the fuselage 12 along a portion of the main strut 28 proximate the connection 94 of the drag brace 55 with the main strut 28. This produces a significant moment arm difference along the main strut 28 between the connections 92 and 94 and the connections 77 and 94. This moment arm difference along the main strut 28 results in relative movement between the inner and outer edge portions 72, 74 and 84, 86 of the door sections 60 and 62 as the nose landing gear arrangement 16 continues to rotate to the extended position 20. In particular, the moment arm formed along the main strut 28 between the connections 77 and 94 is greater than the moment arm formed along the main strut between the connections 92 and 94, causing the actuating arm 68 to move relatively more than the door brace 78 so as to push the inner edge portions 72 and 74 relative to the outer edge portions 84 and 86. As such, the door sections 60 and 62 move towards each other about the generally vertical plane 96 to the folded position 66. In the folded position 66, the folding follow-up door 32 has less area exposed to airflow than it does in the unfolded position 64. Accordingly, the drag produced by the airflow passing over the folding follow-up door 32 is significantly reduced, thereby reducing objectionable noise as the aircraft approaches an airfield for landing.

In an exemplary embodiment, the nose landing gear arrangement 16 is retracted by reversing the steps described in the foregoing paragraphs for extending the nose landing gear arrangement 16. In particular, the nose landing gear arrangement 16 in the extended position 20 (see FIG. 3A-3B) is actuated via the actuator 34 (see FIG. 1) to be retracted, for example, after takeoff of the aircraft 10. During an initial retraction stage, if the clamshell doors 38 were previously shut, the clamshell doors 38 are opened and the nose landing gear arrangement 16 is rotated to the partially extended position 98 using the center of rotation that is located along the portion of the main strut 28 proximate the connection 94 of the drag brace 55 with the main strut 28. As discussed above, this produces a significant moment arm difference along the main strut 28 between the connections 92 and 94 and the connections 77 and 94, causing the actuating arm 68 to move relatively more than the door brace 78 to pull the inner edge portions 72 and 74 inwardly relative to the outer edge portions 84 and 86. As such, the door sections 60 and 62 move away from each other about the generally vertical plane 96 to unfold the folding follow-up door 32 from the folded position 66 to the unfolded position 64. In an exemplary embodiment, once in the partially extended position 98, the center of rotation is moved to the portion of the main strut 28 that is located within the fuselage cavity 24, and the nose landing gear arrangement 16 is rotated to the retracted position 36. The relative positions between the inner and outer edge portions 72, 74 and 84, 86 of the door sections 60 and 62 remains relatively constant between the partially extended position 98 and the retracted position 36 to maintain the folding follow-up door 32 in the unfolded position 64.

Figure 6A:
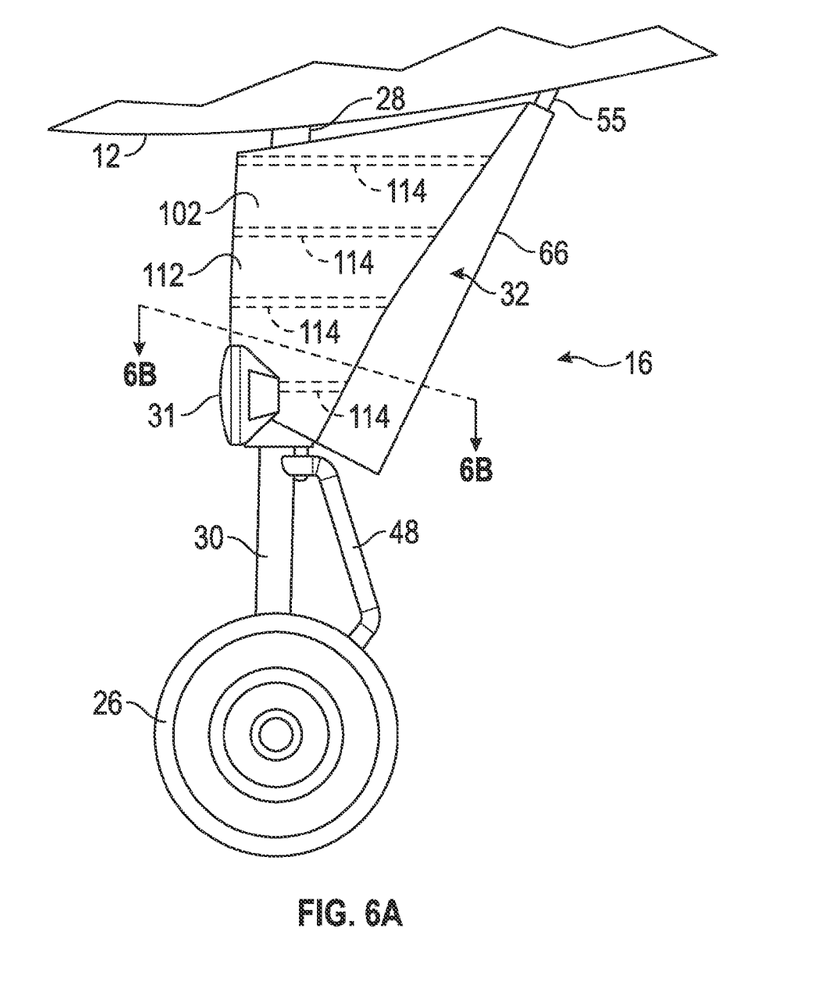
FIG. 6A is a side view of a nose landing gear arrangement in an extended position in accordance with an exemplary embodiment.
Figure 6B:
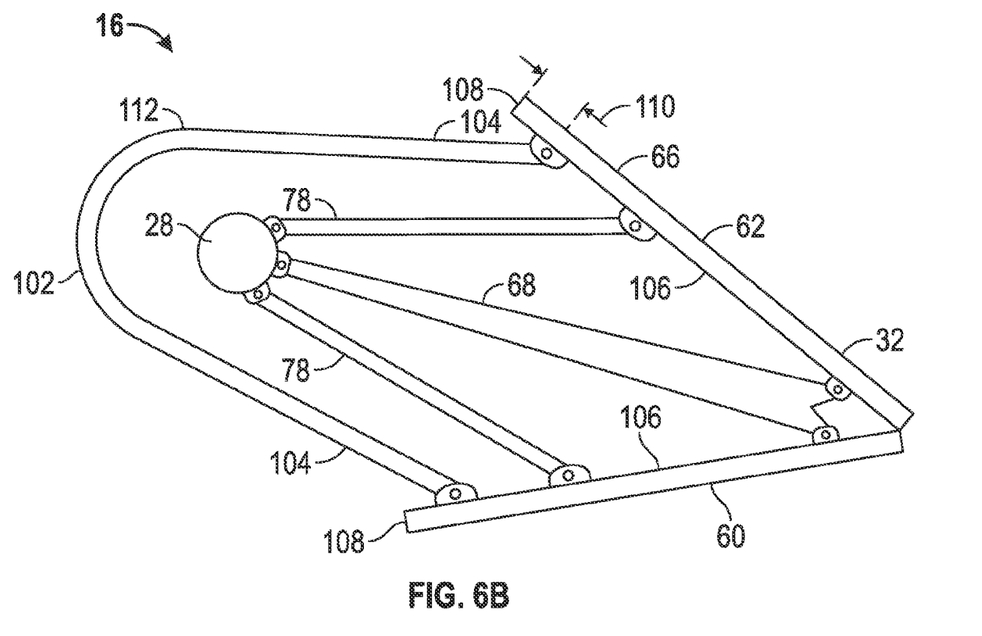
FIG. 6B is a sectional view of the nose landing gear arrangement depicted in FIG. 6A along line 6B-6B.

FIGS. 6A-6B are side and sectional views, respectively, of a nose landing gear arrangement 16 in the extended position 20 in accordance with an exemplary embodiment. As illustrated, the nose landing gear arrangement 16 further comprises a flexible sheet 102 that is disposed substantially around and spaced apart from the main strut 28. The flexible sheet 102 is disposed forward of the folding follow-up door 32 and has outer edge portions 104 that are attached to the door sections 60 and 62. In one example, the door sections 60 and 62 have inner-forward surfaces 106 that face toward the main strut 28. The outer edge portions 104 of the flexible sheet 102 are correspondingly coupled to the door sections 60 and 62 along the inner-forward surfaces 106 inboard of the outer edges 108 of the door sections 60 and 62. In one embodiment, the flexible sheet 102 is coupled to the door sections 60 and 62 inboard of the outer edges 108 a distance (indicated by single headed arrows 110) of from about 10 to about 20 mm to expose the outer edge portions 84 and 86 of the door sections 60 and 62 along the inner-forward surfaces 106 for sealing with the fuselage 12 when the nose landing gear arrangement 16 is in the retracted position 36.

In an exemplary embodiment, the flexible sheet 102 and the folding follow-up door 32 are cooperatively configured to form a substantially airfoil shape that surrounds the main strut 28 when the nose landing gear arrangement 16 is in the extended position 20 and the folding follow-up door 32 is in the folded position 66. As such, drag or resistance from airflow passing over the nose landing gear arrangement 16 is decreased, thereby further reducing objectionable noise as the aircraft 10 approaches an airfield for landing.

In an exemplary embodiment, the flexible sheet 102 comprises a flexible skin 112 and a plurality of juxtaposed reinforcing rods 114 that are spaced apart and coupled to the flexible skin 112. The juxtaposed reinforcing rods 114 together form a semi-flexible reinforcing frame for the flexible skin 112 such that the flexible sheet 102 is relatively flexible to move with the folding follow-up door 32 during folding and unfolding but can substantially maintain a leading edge airfoil profile under force produced from airflow passing over the flexible sheet 102 when the nose landing gear arrangement 16 is in the extended position 20. Non-limiting examples of materials suitable for forming the flexible skin 112 include polymeric materials, such as polyurethane(s), polyester(s), polyamide(s), vinyl(s) (e.g., PVC and the like), polyolefin(s), and the like. Non-limiting examples of materials suitable for the juxtaposed reinforcing rods 114 include metal(s), polymeric material(s) including fiber reinforce polymeric composite(s), such as continuous fiberglass reinforced-epoxy composite(s) and the like.

Figure 7:
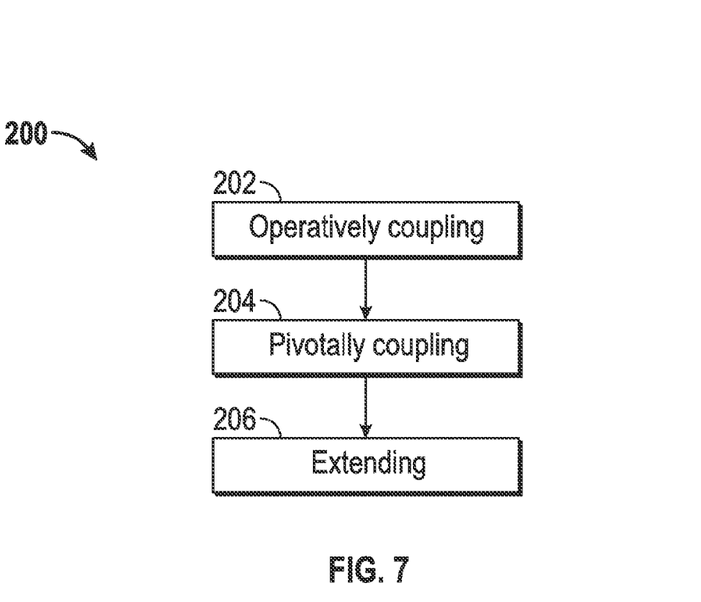
FIG. 7 is a flowchart of a method for making a nose landing gear arrangement for an aircraft in accordance with an exemplary embodiment.

FIG. 7 is a flowchart of a method 200 for making a nose landing gear arrangement for an aircraft in accordance with an exemplary embodiment. The method comprises operatively coupling (step 202) a main strut to a wheel assembly. A folding follow-up door is pivotally coupled (step 204) to a main strut. The folding follow-up door is extended (step 206) to a fuselage of the aircraft. The folding follow-up door is foldable to move first and second door portions of the folding follow-up door towards each other about a generally vertical plane that is substantially aligned with the main strut to define a folded position.

Nose landing gear arrangements for aircrafts, aircrafts including nose landing gear arrangements, and methods for making such nose landing gear arrangements have been described. The exemplary embodiments taught herein provide a nose landing gear arrangement comprising a wheel assembly, a main strut that is operatively coupled to the wheel assembly, and a folding follow-up door that is pivotally coupled to the main strut and extends to the fuselage. When the nose landing gear arrangement is moving from a retracted position to an extended position, the main strut is moved outside of a fuselage of the aircraft substantially along a generally vertical plane to position the wheel assembly for landing of the aircraft. The folding follow-up door comprises a first door section and a second door section that extend outwardly in directions away from each other in an unfolded position. As such, airflow passing over the folding follow-up door creates significant drag that facilitates moving the nose landing gear arrangement to the extended position. At an intermediate position between the retracted and extended positions, the folding follow-up door begins to fold moving the first and second door sections toward each other about the generally vertical plane to a folded position. When the nose landing gear arrangement is in the fully extended position, the folding follow-up door is in the folded position and has less area exposed to the airflow, thereby reducing drag and objectionable noise as the aircraft approaches an airfield for landing.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:
1. A nose landing gear arrangement for an aircraft that includes a fuselage, the nose landing gear arrangement comprising:
   a wheel assembly;
   a main strut operatively coupled to the wheel assembly and configured to extend outside of the fuselage substan- tially along a generally vertical plane to position the wheel assembly for takeoff and/or landing of the aircraft;

a folding follow-up door pivotally coupled to the main strut and extending to the fuselage, wherein the folding follow-up door comprises a first door section and a second door section that extend outwardly in directions away from each other to define an unfolded position, and wherein the folding follow-up door is foldable to move the first and second door sections towards each other about the generally vertical plane to define a folded position; and an actuating arm pivotally coupled to the main strut and independently to the folding follow-up door and configured for moving the folding follow-up door between the unfolded and folded positions.

2. The nose landing gear arrangement of claim 1, wherein the first and second door sections are hingedly coupled together.

3. The nose landing gear arrangement of claim 1, wherein the first door section has a first inner edge portion and the second door section has a second inner edge portion that is adjacent to the first inner edge portion, and wherein the actuating arm has a distal end portion that pivotally couples to the first inner edge portion and independently to the second inner edge portion.

4. The nose landing gear arrangement of claim 1, wherein the first door section has a first outer edge portion and the second door section has a second outer edge portion, and wherein the folding follow-up door is configured to move the first and second outer edge portions towards each other and the generally vertical plane during folding.

5. The nose landing gear arrangement of claim 4, wherein the folding follow-up door is disposed aft of the main strut and is configured to move the first and second outer edge portions generally forward towards the main strut during folding.

6. The nose landing gear arrangement of claim 1, further comprising:

a drag brace disposed between the main strut and the folding follow-up door, wherein the drag brace is pivotally coupled to the main strut and extends toward the fuselage; and a door brace pivotally coupled to the main strut between the drag brace and the actuating arm and having a first arm that is pivotally coupled to the first door section and a second arm that is pivotally coupled to the second door section, and wherein the door brace, the actuating arm, the drag brace, and the main strut are cooperatively configured to move the folding follow-up door between the unfolded and folded positions.

7. The nose landing gear arrangement of claim 6, wherein the first door section has a first outer edge portion and the second door section has a second outer edge portion, and wherein the first arm is pivotally coupled to the first door section proximate the first outer edge portion and the second arm is pivotally coupled to the second door section proximate the second outer edge portion.

8. The nose landing gear arrangement of claim 1, further comprising:

a flexible sheet attached to the folding follow-up door, wherein the flexible sheet and the folding follow-up door are cooperatively configured to form a substantially airfoil shape surrounding the main strut when the folding follow-up door is in the folded position.

9. The nose landing gear arrangement of claim 8, wherein the flexible sheet comprises:

a flexible skin; and a plurality of juxtaposed reinforcing rods that are spaced apart and coupled to the flexible skin to provide a semi-flexible reinforcing frame for the flexible skin.

10. The nose landing gear arrangement of claim 8, wherein the first door section has a first outer edge and the second door section has a second outer edge, and wherein the flexible sheet is coupled to the first and second door sections proximate the first and second outer edges, respectively.

11. The nose landing gear arrangement of claim 10, wherein the first and second door sections each have an inner-forward surface that faces the main strut, and wherein the flexible sheet is disposed adjacent to and coupled to the inner-forward surfaces of the first and second door sections inboard of the first and second outer edges, respectively, at a distance of from about 10 to about 20 mm.

12. An aircraft comprising:

a fuselage; and a nose landing gear arrangement moveable between a retracted position in which the nose landing gear arrangement is disposed in the fuselage and an extended position in which the nose landing gear arrangement extends outside of the fuselage, wherein the nose landing gear arrangement comprises:

a wheel assembly;

a main strut operatively coupled to the wheel assembly and configured to extend distally outside of the fuselage substantially along a generally vertical plane to position the wheel assembly in the extended position for takeoff and/or landing of the aircraft;

a folding follow-up door pivotally coupled to the main strut and extending to the fuselage, wherein the folding follow-up door comprises a first door section and a second door section that extend outwardly in directions away from each other to define an unfolded position, and wherein the folding follow-up door is foldable to move the first and second door sections towards each other about the generally vertical plane to define a folded position; and an actuating arm pivotally coupled to the main strut defining an actuating arm-strut connection and independently to the folding follow-up door, wherein the actuating arm-strut connection is disposed along the main strut distal to the drag brace-strut connection, and wherein the actuating arm is configured to move the folding follow-up door between the unfolded and folded positions during movement of the nose landing gear arrangement between the retracted and extended positions.

13. The aircraft of claim 12, wherein the nose landing gear arrangement further comprises:

a drag brace disposed between the main strut and the folding follow-up door, wherein the drag brace is pivotally coupled to an intermediate portion of the main strut defining a drag brace-strut connection and extends toward the fuselage, and wherein the nose landing gear arrangement is configured to rotate the main strut about a center of rotation proximate the drag brace-strut connection during movement of the nose landing gear arrangement between the retracted and extended positions.

14. The aircraft of claim 12, wherein the nose landing gear arrangement further comprises:

a door brace pivotally coupled to the main strut defining a door brace-strut connection that is disposed along the main strut between the drag brace-strut connection and the actuating arm-strut connection, wherein the actuating arm has a first arm that is pivotally coupled to the first door section and a second arm that is pivotally coupled to the second door section, and wherein the door brace, the actuating arm, the drag brace, and the main strut are cooperatively configured to move the folding follow-up door between the unfolded and folded positions during movement of the nose landing gear arrangement between the retracted and extended positions.

15. The aircraft of claim 12, wherein the first and second door sections are pivotally coupled to the fuselage so as to allow the folding follow-up door to move between the retracted and extended positions and between the unfolded and folded positions.

16. The aircraft of claim 12, wherein the nose landing gear arrangement further comprises:
   a flexible sheet attached to the folding follow-up door, wherein the flexible sheet and the folding follow-up door are cooperatively configured to form a substantially airfoil shape about the main strut when the folding follow-up door is in the folded position.

17. The aircraft of claim 16, wherein the first door section has a first outer edge and the second door section has a second outer edge, and wherein the flexible sheet is coupled to the first and second door sections inboard of the first and second outer edges, respectively.

18. A method for making a nose landing gear arrangement for an aircraft that includes a fuselage, the method comprising the steps of:
   operatively coupling a main strut to a wheel assembly;
   pivotally coupling a folding follow-up door to the main strut and extending the folding follow-up door to the fuselage, wherein the folding follow-up door is foldable to move first and second door portions of the folding follow-up door towards each other about a generally vertical plane that is substantially aligned with the main strut to define a folded position; and
   pivotally coupling an actuating arm to the main strut and independently to the folding follow-up door for moving the folding follow-up door between an unfolded position and the folded position.

* * * * *